US012590796B2

(12) United States Patent
Schuh et al.

(10) Patent No.: US 12,590,796 B2
(45) Date of Patent: Mar. 31, 2026

(54) DEVICE AND METHOD FOR DETERMINING DIMENSIONAL DATA RELATING TO AN OBJECT

(71) Applicant: Sikora AG, Bremen (DE)

(72) Inventors: Kolja Tobias Schuh, Bremen (DE); Hilmar Bolte, Bremen (DE)

(73) Assignee: Sikora AG, Bremen (DE)

( * ) Notice: Subject to any disclaimer, the term of this patent is extended or adjusted under 35 U.S.C. 154(b) by 376 days.

(21) Appl. No.: 18/118,877

(22) Filed: Mar. 8, 2023

(65) Prior Publication Data

US 2023/0288187 A1 Sep. 14, 2023

(30) Foreign Application Priority Data

Mar. 9, 2022 (DE) ..................... 10 2022 105 479.9

(51) Int. Cl.
*G01B 11/02* (2006.01)
*G01N 21/88* (2006.01)

(52) U.S. Cl.
CPC ............. *G01B 11/02* (2013.01); *G01N 21/88* (2013.01)

(58) Field of Classification Search
None
See application file for complete search history.

(56) References Cited

U.S. PATENT DOCUMENTS 10,684,119 B2 6/2020 Sikora
2021/0180946 A1 6/2021 Kim et al.

FOREIGN PATENT DOCUMENTS

| DE | 102016202530 A1 | 8/2017 |
| DE | 102016105599 A1 | 10/2017 |
| DE | 202016008526 U1 | 5/2018 |
| DE | 102017207648 A1 | 11/2018 |
| DE | 102017125753 A1 | 5/2019 |
| DE | 202021100416 U1 | 6/2021 |
| DE | 102020120545 A1 | 2/2022 |
| JP | 2010156664 A | 7/2010 |
| JP | 2015-508160 | 3/2015 |

(Continued)

OTHER PUBLICATIONS

EP 23156767.8; filed Feb. 15, 2023; EP Search Report dated Jul. 18, 2023 (7 pages).

(Continued)

*Primary Examiner* — Edwin C Gunberg
(74) *Attorney, Agent, or Firm* — Barclay Damon LLP

(57) ABSTRACT

A method for determining dimensional data of an object includes emitting terahertz radiation by a first transmitter onto a surface of the object. The terahertz radiation emitted by the first transmitter is received by a first receiver after the terahertz radiation has passed through the object. Terahertz radiation comprising a bandwidth of less than 5% of a carrier frequency of the terahertz radiation is emitted by a second transmitter onto at least one location on the surface of the object. The terahertz radiation emitted by the second transmitter is received by a second receiver after the terahertz radiation has passed through the object. A dimension of the object is determined from one of: (i) the terahertz radiation received by the second transmitter; and (ii) a temporal or spatial change of the terahertz radiation received by the second receiver in consideration of that received by the first receiver.

23 Claims, 2 Drawing Sheets

(56)  References Cited

FOREIGN PATENT DOCUMENTS

| | | | |
|---|---|---|---|
| JP | 2020518838 | | 6/2020 |
| WO | 2016139155 | A1 | 9/2016 |
| WO | WO-2017140729 | A1 * | 8/2017 ............ G01N 21/85 |
| WO | 2018138523 | A1 | 8/2018 |

OTHER PUBLICATIONS

RU 2023105102/28(011122); filed Mar. 5, 2023; Office Action dated Jan. 18, 2024 (7 pages).
JP P2023-021949; filed Aug. 1, 2022; Notification of Reasons for Refusal dated Jan. 30, 2024 (4 pages).
JP P2023-021949; filed Aug. 1, 2022; English translation of Notification of Reasons for Refusal dated Jan. 30, 2024 (4 pages).

* cited by examiner

DEVICE AND METHOD FOR DETERMINING DIMENSIONAL DATA RELATING TO AN OBJECT

CROSS REFERENCE TO RELATED INVENTION

This application is based upon and claims priority to, under relevant sections of 35 U.S.C. § 119, German Patent Application No. 10 2022 105 479.9, filed Mar. 9, 2022, the entire contents of which are hereby incorporated by reference.

TECHNOLOGICAL FIELD

The invention relates to a method for determining dimensional data, in particular thickness data, relating to a plate-shaped object or a strand-shaped object, in particular a pipe. The inventive method comprises emitting terahertz radiation by a first transmitter onto at least one location on the surface of the object at least one point in time, and receiving the terahertz radiation emitted by the first transmitter by a first receiver after the radiation has passed through the object at least once. The invention also relates to a device for determining dimensional data relating to a plate- or strand-shaped object, comprising a first transmitter which is designed to emit terahertz radiation onto at least one location on the surface of the object at least one point in time, a first receiver which is designed to receive the terahertz radiation emitted by the first transmitter after the radiation has passed through the object at least once.

BACKGROUND

Dimensional data relating to plate-shaped or strand-shaped objects, for example pipes, can be measured using terahertz radiation, so-called millimeter waves. Such dimensional data include, for example, diameters or thicknesses, in particular wall thicknesses. A terahertz radiation signal is emitted by a transmitter onto the object to be measured. The emitted radiation signal passes through the object and is reflected on boundary surfaces of the object. Subsequently, the terahertz radiation is received by a receiver. On account of the object, the radiation signal is manipulated, in particular by means of reflection, scattering, absorption, and refraction. The resulting change of the terahertz radiation signal makes it possible to draw conclusions on the object, wherein, in particular, reflections on boundary layers of the object are evaluated in order to determine dimensional data. Moreover, the object delays the terahertz radiation signal on account of the higher density thereof in relation to propagation in air, and therefore absolute values of the dimensions of the object can be determined if the orientation and refractive index of the material are known by measuring the delay of the radiation signal. This applies, in particular, to plate-shaped or strand-shaped objects such as pipes.

However, in order to evaluate reflections on boundary layers of the object, a bandwidth of the terahertz radiation used that allows for resolution of the individual boundary layer is required. In the case of small dimensions to be measured, for example lower wall thicknesses, this places strict requirements on the bandwidth of the terahertz radiation used. The required bandwidth is approximately equal to the speed of light divided by twice the product of the refractive index and the structure to be resolved, for example a distance of boundary surfaces to be resolved. Depending on the structure size, this may require bandwidths in the range of 100 GHz. This makes the terahertz transmitters and receivers required for reliably measuring small structures complex and cost-intensive. Often, special approval procedures are required. The outlay increases further if multiple transmitters and receivers of this kind are provided, for example arranged around a pipe to be measured. This is often desirable in order to irradiate the object and thus measure it as fully as possible.

Another problem is posed by disturbances in the object geometry, in particular defects such as blowholes, dents, bulges, or the like. In order to detect defects, DE 10 2016 105 599 A1 proposes radiating terahertz radiation onto boundary surfaces of an object to be measured at a non-perpendicular angle, such that reflections coming from the test object and directed at a transmitting and receiving unit only occur at defects of the object. Alternatively, the main reflected radiation may also be suppressed by means of an aperture in order to exclude reflections by the boundary surfaces of the object from the measurement.

DE 20 2021 100 416 U1 proposes a device having an evaluation apparatus for detecting defects of a strand-shaped product conveyed in a conveying direction, which evaluation apparatus is designed to infer a defect of the strand-shaped product from a temporary change of a terahertz radiation signal received by at least one receiver.

BRIEF SUMMARY OF THE INVENTION

Proceeding from the explained prior art, the object of the invention is to provide a method and a device of the type mentioned at the outset, by means of which dimensional data relating to a plate-shaped or strand-shaped object can be determined reliably and precisely with reduced outlay.

The invention achieves the object for a method of the type mentioned at the outset by means of emitting terahertz radiation having a bandwidth of less than 5% of the carrier frequency of the terahertz radiation by a second transmitter onto the surface of the object at multiple points in time and/or onto multiple locations on the surface of the object. The terahertz radiation emitted by the second transmitter is received by a second receiver after the radiation has passed through the object at least once. A dimension of the object is determined from the terahertz radiation received by the second transmitter and/or from a temporal and/or spatial change of the terahertz radiation received by the second receiver in consideration of the terahertz radiation received by the first receiver.

An embodiment of a device for determining dimensional data relating to an object includes a second transmitter configured to emit terahertz radiation having a bandwidth of less than 5% of the carrier frequency of the terahertz radiation onto the surface of the object at multiple points in time and/or onto multiple locations on the surface of the object. A second receiver is configured to receive the terahertz radiation emitted by the second transmitter after the radiation has passed through the object at least once. An evaluation apparatus is configured to determine a dimension of the object from the terahertz radiation received by the second transmitter and/or from a temporal and/or spatial change of the terahertz radiation received by the second receiver in consideration of the terahertz radiation received by the first receiver.

The object to be measured according to the invention may, for example, be a plastics or glass object. It is plate-shaped or strand-shaped, for example pipe-shaped. The object may be conveyed through the device having the first and second transmitters and receivers during the measurement, a strand-shaped object along its longitudinal axis, in particular. For this purpose, the device may comprise a conveying apparatus. The object may be exiting a production device, for example an extrusion device. It may still have a high temperature during the measurement. It is also possible that solidification of the object is not yet complete during the measurement. The object may therefore comprise molten components, in particular.

In an embodiment, terahertz radiation, so-called millimeter waves, is used to measure the object. The terahertz radiation may, for example, be in a frequency range of from 10 GHz to 3 THz. Terahertz radiation is well suited for measuring objects, for example plastics objects, in difficult measuring environments, for example in production facilities, since terahertz radiation is largely insensitive to interference caused, for example, by water vapor. Therefore, strand-shaped objects exiting extrusion devices, for example, are cooled by applying a cooling fluid, for example water. This produces water vapor.

The invention is based on the idea of carrying out combined measurement of the object using a first measuring system having a first transmitter and first receiver, on the one hand, and a second measuring system having a second transmitter and second receiver, on the other hand. The second transmitter emits terahertz radiation having a bandwidth of less than 5% of the carrier frequency of the terahertz radiation at multiple points in time and/or onto multiple locations on the surface of the object. The bandwidth of the terahertz radiation is defined as the difference between the lower and upper frequency limit of the terahertz radiation emitted by the transmitter. The frequency limits are above and below the carrier frequency, in particular at the same distance from the carrier frequency. The first transmitter can emit terahertz radiation having a greater bandwidth than the second transmitter. On account of the preferably greater bandwidth, absolute values of dimensional data relating to the object can be determined by means of the first transmitter and first receiver if the refractive index of the object is known or has been metrologically determined. For this purpose, reflections of the terahertz radiation on boundary layers of the object can be evaluated in a manner known per se, for example based on propagation time measurements. According to the invention, this measurement is combined with a measurement using a second transmitter that emits terahertz radiation having a lower bandwidth at multiple times and/or onto multiple locations on the surface of the object. A delay of the terahertz radiation during passage of radiation through the object can be measured using the narrow-band second transmitter and second receiver. Based on a comparison of the radiation signals emitted, in particular, at different points in time, a dimension of the object, in particular a dimensional change of the object, for example a change in thickness of the object, can be identified at the measuring position of the second transmitter or, alternatively, receiver. This may, for example, be done based on a phase change of the emitted terahertz radiation of the second transmitter caused by the object during passage of radiation through the object. Thickness fluctuations can be detected in this manner. In the case of a plate-shaped object, a clear measurement is produced straight away. In the case of a pipe-shaped object, the measurement delivers the sum of the thickness fluctuations of both pipe walls through which radiation has passed. In combination with the measuring system consisting of the first transmitter and first receiver, which, for example, carries out a measurement more rarely than the measuring system consisting of the second transmitter and second receiver and, for example, measures the absolute thickness of the object, an absolute value of the determined dimension, in particular of the determined dimensional change, for example a change in thickness, can be determined at the measuring position of the second transmitter or, alternatively, receiver, i.e. the position on the object irradiated by the second transmitter. It is also possible to infer the thickness fluctuations of the individual pipe walls based on the absolute thickness measurement of, for example, a pipe.

Therefore, absolute dimensional values, in particular dimensional changes, for example changes in thickness, can be reliably determined at any time in the combination of both measuring systems. The combination of measuring systems according to the invention offers the advantage that the first measuring system, which is for example of a wider bandwidth, must only carry out an absolute thickness measurement occasionally, and at some locations on the surface of the object, whereas a measurement using the second measuring system can take place more frequently and at more locations on the surface of the object. Nevertheless, complete absolute determination of the dimensional data, for example dimensional changes, may take place by means of, for example, substantially complete detection of the object using the second measuring system by means of the correlation with the first measuring system. The second measuring system consisting of the second transmitter and receiver is used, in particular, not to evaluate the direct radiation reflections on boundary surfaces of the object, but rather the delay of the terahertz radiation caused by the object during passage of radiation. In contrast, the first measuring system is used, in particular, to evaluate reflections of the terahertz radiation on boundary surfaces of the object.

Measuring systems having a lower bandwidth are not only more cost-effective, but also easier to implement, easier to evaluate, and generally have less stringent approval requirements. On account of the combination of measuring systems according to the invention, an overall lower outlay is made possible, since comprehensive measurement of the object, i.e. extensive emission of terahertz radiation onto the object, only needs to be done using the second measuring system. For example, in the case of an arrangement of multiple transmitters and receivers around the object to be measured, the less expensive narrow-band second transmitters and transmitters can be positioned in greater numbers around the object, without incurring the costs associated with a larger number of wider-band transmitters and receivers. Vice versa, thinner objects can be measured at the same bandwidth.

In principle, it is possible for the terahertz radiation to only be emitted by the first transmitter onto one location on the surface of the object at one point in time. However, it is also possible for the first transmitter, like the second transmitter, to also emit terahertz radiation at multiple points in time and/or onto multiple locations on the surface of the object. For example, it is possible, as explained, for the object to be conveyed through the device during the measurement. In this case, terahertz radiation emitted onto the moving object can be emitted onto multiple locations on the surface of the object at multiple points in time by means of a, for example stationary, first transmitter or second transmitter. Preferably, terahertz radiation is emitted by the second transmitter at more points in time and/or onto more locations on the surface of the object than in the case of terahertz radiation from the first transmitter. It is possible, in particular, for terahertz radiation to be emitted by means of the second transmitter onto substantially the entire surface of the object, for example in the case of a plate-shaped object transversely to a conveying direction of the object or, alternatively, in the case of the strand-shaped object over the entire circumference of the object conveyed, for example, along the longitudinal direction thereof. In the case of a sufficiently fast movement of the second transmitter transversely to the conveying direction or, alternatively, around the object, or in the case of a sufficient number of second transmitters and, accordingly, second receivers being provided, in this way, substantially complete coverage of the object surface and thus measurement of the object by the second measuring system is possible. The measurements carried out comparatively more rarely by the first measuring system are still sufficient for converting the dimensional changes identified by the second measuring system into corresponding absolute values.

As explained, the first transmitter preferably has a greater bandwidth than the second transmitter. According to one embodiment, the bandwidth of the terahertz radiation emitted by the first transmitter may be more than 10%, preferably more than 20%, of the carrier frequency of the terahertz radiation. The bandwidth of the terahertz radiation emitted by the first transmitter may also be more than 10 GHz, preferably more than 20 GHz. The bandwidth of the terahertz radiation emitted by the first transmitter may be greater than the speed of light divided by twice the product of the refractive index and the dimension to be measured, for example a wall thickness. A wider-band sensor of this kind is associated with a higher outlay. In exchange, a wider-band transmitter of this kind is capable of reliably resolving even short distance of boundary surfaces of the object and thus of reliably determining the absolute dimensions, for example the absolute thickness of the object and the refractive index. However, it would also be conceivable for the first transmitter to also be a narrow-band transmitter that operates independently of the second transmitter and, for example, determines the total thickness of the object based on a predefined refractive index.

According to another embodiment, the bandwidth of the terahertz radiation emitted by the second transmitter may be less than 3%, preferably less than 2%, of the carrier frequency of the terahertz radiation. It is particularly preferable if terahertz radiation within an ISM band can be used as the terahertz radiation of the second transmitter. ISM (Industrial, Scientific, and Medical) bands are frequency ranges which can generally be used without approval. As a result, the outlay is further reduced. An example of a suitable ISM band is a frequency band in the range of from 122 to 123 GHz, i.e. with a bandwidth of 1 GHz. In particular, the bandwidth of the second transmitter may be lower than, preferably two times lower than, twice the speed of light divided by the product of the refractive index and the structure to be measured, for example the wall thickness.

According to a particularly feasible embodiment, the first transmitter and the first receiver may be formed by a first transceiver and/or the second transmitter and the second receiver may be formed by a second transceiver. The corresponding transmitters and receivers are thus arranged at the same location or rather integrated as transceivers.

According to another embodiment, it can be provided that a first reflector for the terahertz radiation emitted by the first transmitter is arranged on the side of the object that is opposite the first transmitter and/or that a second reflector for the terahertz radiation emitted by the second transmitter is arranged on the side of the object that is opposite the second transmitter. On account of the reflectors, the terahertz radiation is reflected in such a way after the radiation has passed through the object that it is received by the respective receiver after passing through the object once again, in particular the receiver designed in the form of a transceiver together with the respective transmitter.

In an embodiment, the second transmitter and the second receiver may rotate about the object and/or traverse the length of the object during the measurement. Alternatively or additionally, it is also possible for multiple second transmitters and second receivers arranged around the object or along the object to be provided. As already explained, the narrow-band second measuring system is cost-effective and of low outlay. Accordingly, said measuring system may also be quickly rotated or, alternatively, transposed relative to the object or, alternatively, a relatively large number of second transmitters and second receivers may be provided. As a result, particularly comprehensive coverage and thus measurement can also take place for an object that is moved through the device during the measurement. For example, if multiple second transmitters and second receivers are provided, these may be arranged so as to be stationary, wherein, with a sufficient number, substantially complete coverage of the object surface is possible for the measurement. It is also conceivable for multiple second transmitters and second receivers to be provided which rotate or traverse at the same time, as already explained. A linear movement, in particular traversal, may in particular take place along the object in the case of a plate-shaped object, namely in the longitudinal direction or rather conveying direction and/or transversely to the longitudinal direction or rather conveying direction. A combined traversing and rotational movement is also possible, such that a helical movement about a, for example strand-shaped, object takes place, for example.

In principle, the first measuring system consisting of the first transmitter and first receiver can also be moved relative to the object in the manner explained above. It would also be conceivable to provide multiple first transmitters and first receivers. The corresponding embodiments may be the same as in the case of the second transmitter and second receiver, as explained above. As explained at the outset, a lower coverage of the object surface is nevertheless sufficient in this respect.

According to another embodiment, the second transmitter may emit terahertz radiation onto the surface of the object at an oblique angle of incidence, i.e. in particular an angle of incidence that deviates from normal incidence of radiation. In principle, the problem arises that additional signals can be caused, for example by reflections by the object, during measurement of the object with terahertz radiation using the second measuring system consisting of the second transmitter and the second receiver. Additional signals of this kind can influence the measurement result in an undesirable manner, in particular the measured delay due to the passage of radiation through the object. Additional signals of this kind can, in principle, be filtered out by computational means, such that only the delay signal that is sought remains. This requires a certain bandwidth of the terahertz radiation that is not, however, defined by the dimensions of the object, in particular short distances between boundary surfaces, but rather by the distance between the disturbances causing the additional signals, for example boundary surfaces, and the measuring system, for example a reflector. By selecting a corresponding distance, for example, between a reflector and the object, a reliable measurement can therefore also take place with a comparatively small bandwidth in spite of additional signals. However, according to the above-mentioned embodiment, undesired signals are prevented in that an inclination of the beam path with respect to the irradiated surface of the object prevents additional signals caused by reflections on boundary surfaces of the object. Signals directly caused by the measuring system can be calibrated out. By being able to remove all undesired components from the measured signal, no further computational signal filtering is required. Accordingly, measurements can take place with a minimal bandwidth through to mono-frequency continuous wave (CW) operation. At the same time, a short distance between the measuring system, for example a reflector, and the object is possible, such that the installation space of the device is reduced.

As already explained, the (absolute) dimension of the object can be determined in consideration of the refractive index of the object. In principle, the refractive index for the material of the object can be assumed to be known for the determination of the absolute values of the identified dimensional changes. However, in practice, unrecognized changes in the refractive index can sometimes occur depending on the intended use. For example, in the case of objects produced in extrusion devices, this can take place due to an unrecognized change in the plastics mixture supplied to the extruder. The extruded plastics generally comprise additives, wherein the number of additives and also the composition of the additives can vary. As a result, errors can occur if the refractive index is assumed to be constant.

According to another embodiment, it is therefore possible to determine the refractive index of the object from the terahertz radiation received by the first receiver. In principle, the refractive index can be determined as described, for example, in WO 2016/139155 A1. Therefore, it is possible to infer the refractive index of the strand material from a comparison of the propagation time of the terahertz radiation between the first transmitter and the first receiver without an object in the beam path with the propagation time between the first transmitter and the first receiver with an object in the beam path at a known wall thickness. Only the position of the first transmitter and first receiver and any reflector present must be known.

According to another embodiment, it is possible to determine the dimension, in particular the dimensional change of the object and/or the absolute value of the determined dimension or dimensional change, from a phase change, caused by the object during passage of radiation, of the terahertz radiation emitted by the first and/or second transmitter. By evaluating a phase change of the emitted terahertz radiation caused by the object, it is possible to determine the dimension in accordance with the invention in a particularly reliable and precise manner. In order to clearly determine the phase or rather phase change, the I channel and the Q channel must be evaluated, in particular when very narrow-band terahertz radiation is used, up to CW operation. By means of this I and Q method (in-phase and quadrature method), the phase information of a high-frequency carrier signal can be determined in a reliable manner. Although the evaluation of the phase change allows for a more accurate measurement, it would, in principle, also be conceivable to carry out a frequency measurement or amplitude evaluation.

According to another embodiment, a defect of the object can be inferred based, in particular, on rapid signal changes of the terahertz radiation signal received by the second receiver. In particular, material changes to the objects that are relatively small, in particular less than or approximately equal to the wavelength of the terahertz radiation, are to be understood as defects. Defects of this kind act as Mie scatterers which, in a rough approximation, scatter approximately to the same extent in all directions. This means that the signal scattered back by these defects are small relative to the overall scattered signal. Typically, at a distance of just 100 mm, it is less than 1%. It decreases proportionally to $1/r^2$, wherein r=distance.

In the case of short distances and little noise, which can be achieved, for example, by means of a low bandwidth of the terahertz radiation, the scattered signal can be detected directly and interpreted as a defect. In contrast, the approach presented, for example, in the above-mentioned document DE 10 2016 105 599 A1 for detecting defects by means of signal amplitudes of the direct reflection of a defect has a low sensitivity, in particular in the presence of reflective surfaces, as can be provided in the present case by means of the reflector. In contrast, the approach described in DE 20 2021 100 416 U1, which is also explained above, additionally and substantially uses phase changes of the terahertz radiation, as a result of which the sensitivity of the measurement is significantly improved.

The above-mentioned embodiment is based on the idea that relatively slow changes of the terahertz radiation signal are caused by dimensional changes of the object, whereas in comparison to dimensional changes, smaller defects cause faster changes of the terahertz radiation signal that are isolated in the context of a diffraction pattern. This makes it possible to distinguish between dimensional changes on the one hand and defects on the other hand based on the received terahertz radiation signal. The regularly coherent terahertz radiation signals cause diffraction effects at the defects, such that the measured radiation signal is also influenced when the defect is located near to the radiation paths that are expected in terms of beam optics. Accordingly, a diffraction pattern of this kind can be evaluated, specifically with regard to both the amplitude and the phase, in order to identify defects.

The terahertz radiation signal directly scattered by means of a defect generally changes quickly with location (or, alternatively, over time due to the movement of the measured object or of the transmitter or, alternatively, receiver). Depending on the exact embodiment, said terahertz radiation signal typically has an oscillation length of a few millimeters. For example, in the case of a terahertz frequency of 120 GHz and the use of a transmitter and receiver with an oblique angle of incidence of 20°, an oscillation length of approximately 3.7 mm can be expected. Accordingly, the terahertz radiation signal can be reliably distinguished from other signal changes caused by more significant dimensional changes, for example using a local frequency analysis or matching filter. This is in particular because the oscillation length of a defect signal is independent of the defect and is thus known and therefore, in the event of the movement speed of the measured object or of the transmitter or, alternatively, receiver being known, the frequency of the signal changes caused by a defect is known. This is not possible, for example, when considering the amplitudes of the terahertz radiation signal, and therefore an evaluation of the frequency or, alternatively, phase of the signal pattern caused by the defect is preferred.

The method according to the invention can be performed with the device according to the invention. Accordingly, the device according to the invention, in particular the evaluation apparatus thereof, can be designed to carry out the method according to the invention.

BRIEF DESCRIPTION OF THE DRAWINGS

The invention will be explained in more detail below based on exemplary embodiments. In the drawings.

The same reference signs refer to the same objects in the figures unless indicated otherwise.

DETAILED DESCRIPTION OF THE INVENTION

Figure 1:
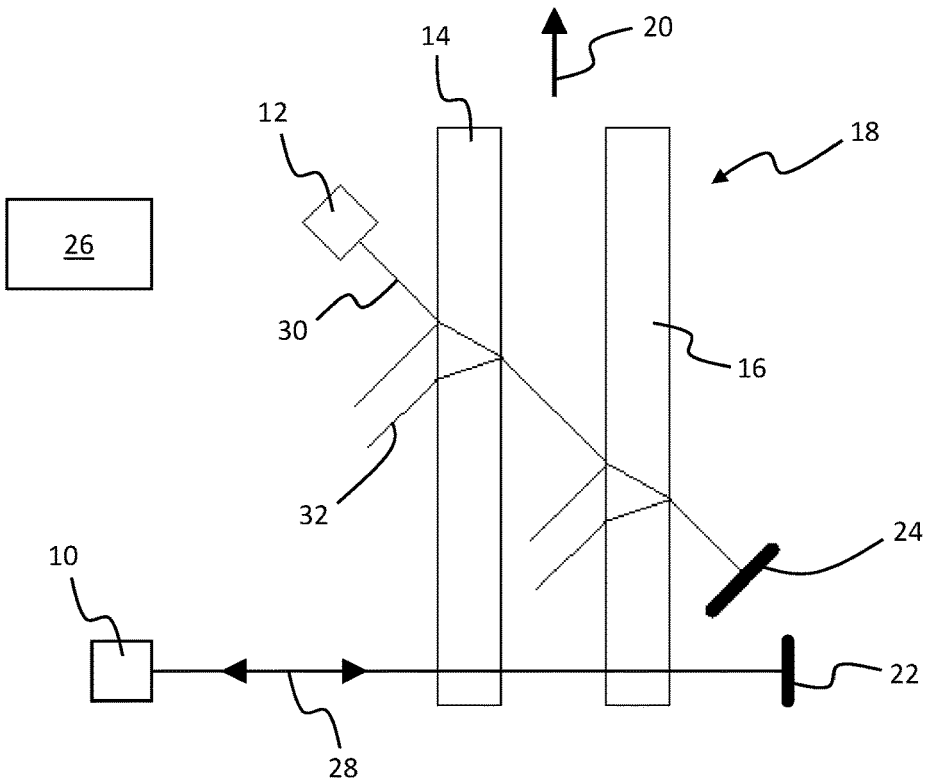
FIG. 1 schematically depicts a device for determining dimensional data related to an object in a first application scenario.

The device shown in FIG. 1 comprises a first transceiver 10, comprising a first transmitter 10 for terahertz radiation and a first receiver 10 for the terahertz radiation emitted by the first transmitter 10. The device also comprises a second transceiver 12, comprising a second transmitter 12 for terahertz radiation and a second receiver 12 for receiving the terahertz radiation emitted by the second transmitter 12. The second transmitter 12 emits terahertz radiation having a bandwidth of less than 5% of the carrier frequency of the terahertz radiation, which is accordingly received by the second receiver 12. In contrast, the first transmitter 10 emits terahertz radiation having a greater bandwidth, in particular terahertz radiation having a bandwidth of more than 10%, preferably more than 20%, of the carrier frequency of the terahertz radiation, which is accordingly received by the first receiver 10.

In FIG. 1, two opposing wall portions 14, 16 of a pipe 18 to be measured are shown in a highly schematic manner, said pipe being a plastics pipe, for example, in particular a plastic pipe 18 exiting an extrusion device. The pipe 18 may be conveyed along its longitudinal axis through the device, as illustrated by the arrow 20 in FIG. 1. It should be understood that, in FIG. 1, only a small portion of the pipe 18 is shown. Moreover, the first transceiver 10 is assigned a first reflector 22, which is arranged on a side of the pipe 18 opposite the first transceiver 10. Accordingly, the second transceiver 12 is assigned a second reflector 24, which is arranged on a side of the pipe 18 opposite the second transceiver 12. Moreover, the device comprises an evaluation apparatus 26, which is connected to the transceivers 10, 12, in particular to the transmitters 10, 12 and receivers 10, 12 of the transceivers 10, 12, such that same can be controlled by means of the evaluation apparatus 26 and measurement data, in particular of the receivers 10, 12, can be forwarded to the evaluation apparatus for evaluation. For this purpose, the transceivers 10, 12 are connected to the evaluation apparatus 26 via suitable signal and control lines.

Terahertz radiation is emitted by the first transmitter 10 onto the pipe 18 in order to measure the pipe 18, wherein the terahertz radiation is reflected by the reflector 22 after passing through the pipe 18, such that it arrives back at the first transceiver 10 after passing through the pipe 18 once more and is received as a measurement signal by the first receiver 10. This is shown in FIG. 1 by the beam path 28. In the process, the terahertz radiation is reflected on boundary surfaces of the pipe 18. The measurement signals of the first receiver 10 are forwarded to the evaluation apparatus 26, which determines absolute dimensional data of the pipe 18, for example the wall thicknesses of the wall portions 14, 16, from the radiation signals reflected on the boundary surfaces in consideration of the refractive index of the material of the pipe 18, for example using propagation time measurements. The refractive index can be assumed to be known for the pipe 18 or determined by means of the evaluation apparatus

26 in the manner explained above. The first transceiver 10 may be arranged so as to be stationary and may emit terahertz radiation for a measurement at regular time intervals.

During this measurement process, terahertz radiation of a lower bandwidth is also emitted by the second transmitter 12 onto the pipe 18, wherein this terahertz radiation is reflected by the second reflector 24 after passing through the pipe 18 and arrives back at the second transceiver 12 after passing through the pipe 18 once more and is received as a measurement signal by the second receiver 12. This is illustrated in FIG. 1 by the beam path 30. As can be seen in FIG. 1, the terahertz radiation is emitted at an oblique angle of incidence onto the surface of the pipe 18. The terahertz radiation is refracted and reflected on the boundary surfaces of the pipe, as shown in FIG. 1 by 32, for example. However, due to the oblique angle of incidence of the terahertz radiation, these reflection signals do not arrive back at the second transceiver 12 and thus the second receiver 12. Therefore, substantially only the radiation components that pass through the pipe 18 are detected and measured by the second receiver 12. The measurement signals are, in turn, transmitted to the evaluation apparatus 26, which determines a temporal and/or spatial dimensional change of the pipe 18 based on the delay of the terahertz radiation caused by the pipe 18. In order to determine the dimensional changes, a phase change of the terahertz radiation caused by the pipe 18 is determined, in particular. In order to temporally and/or spatially detect the dimensional changes, the terahertz radiation is emitted by the second transmitter 12 at multiple points in time and, due to the pipe 18 being conveyed in the longitudinal direction, onto multiple locations on the surface of the pipe 18. The second transceiver 12 can rotate about the pipe 18 during the measurement in order to perform a measurement around the circumference of the pipe 18. However, it would also be conceivable to arrange multiple second transceivers 12 so as to be distributed around the circumference of the pipe 18.

The evaluation apparatus 26 correlates the measurement signals of the first and second receiver 10, 12 and determines the absolute values of the determined dimensional changes of the pipe 18 therefrom. In the present case, the measured dimensional data or rather dimensional changes are thickness data or rather changes in thickness.

Figure 2:
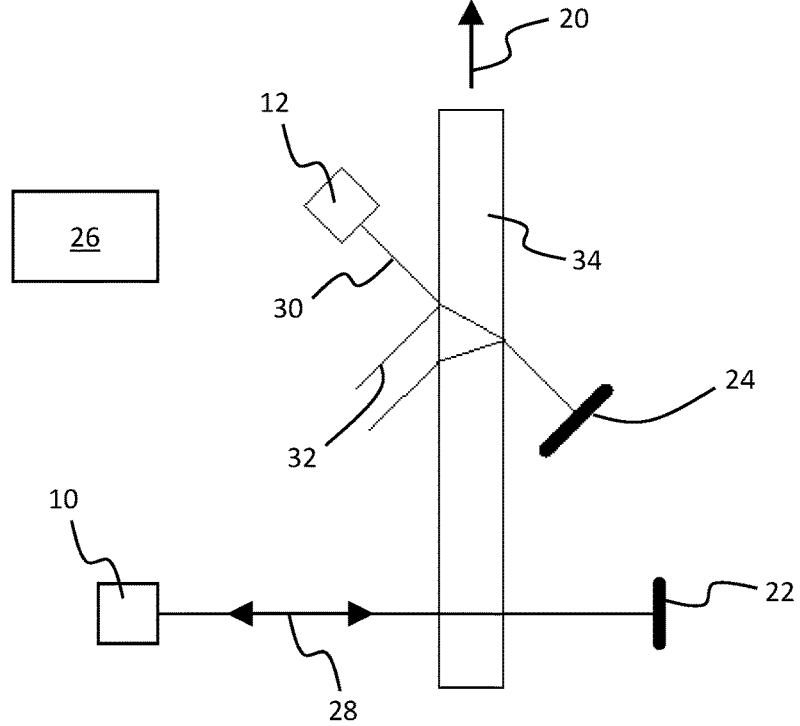
FIG. 2 schematically depicts the device from FIG. 1 in a second application scenario.

FIG. 2 shows the device from FIG. 1 based on the measurement of a plate-shaped object 34. The plate-shaped object 34 can, in turn, be conveyed through the device in the direction 20, for example. The measurement and evaluation take place in substantially the same manner as explained with regard to FIG. 1. However, unlike in FIG. 1, the measurement signals in FIG. 2 provide clear dimensional data, in particular thickness data, relating to the plate-shaped object 34, whereas in FIG. 1 the determined dimensional data, in particular thickness data, are overall data for both pipe walls 14, 16. In FIG. 2, it would be conceivable, for example, for multiple second transceivers 12 to be arranged one next to the other transversely to the conveying direction 20, i.e. into the drawing plane in FIG. 2, or for the second transceiver 12 to traverse in this direction during the measurement. In this way, for example, a measurement can take place substantially over the entire width of the plate-shaped object 18, 34.

In both application scenarios shown in FIG. 1 and FIG. 2, detection of defects of the objects 18, 34 being measured is still possible, in particular by inferring a defect of the object 18, 34 based on rapid signal changes of the terahertz radiation signal received by the second receiver 12.

Figure 3:
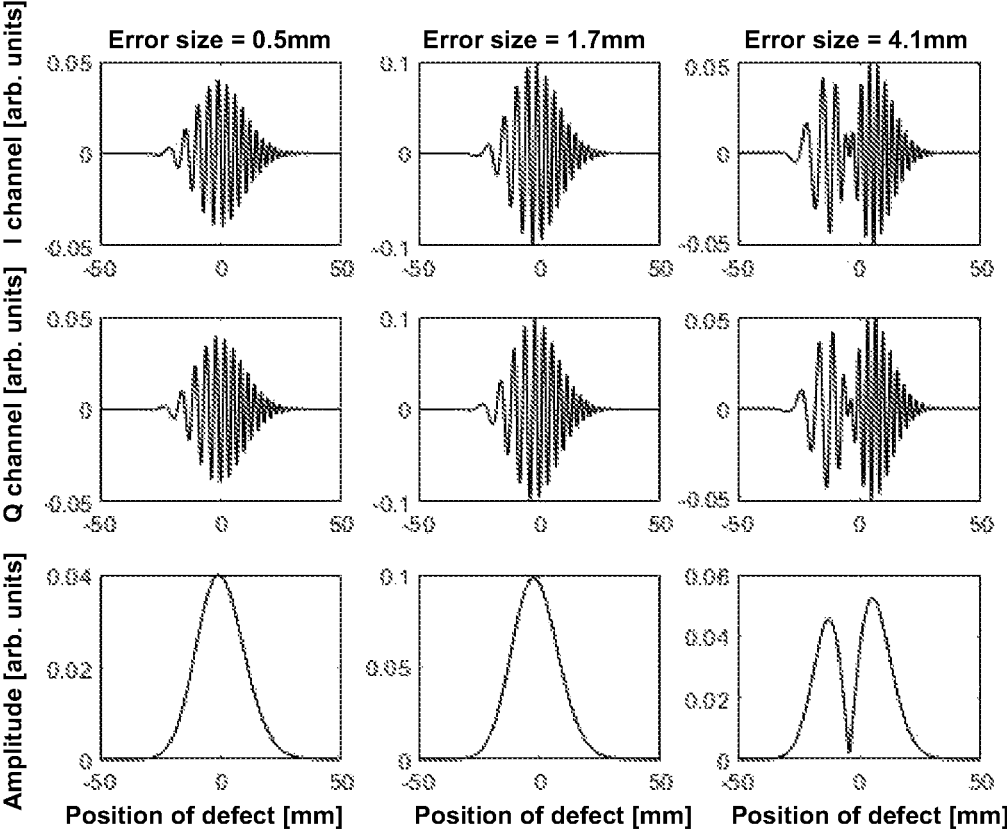
FIG. 3 graphically illustrates a defect detection according to the invention.

This will be explained in more detail based on FIG. 3. Here, corresponding measurement signals of the second receiver 12 are shown for three different defect sizes (error sizes), wherein the position of the defect in millimeters is specified in each case on the x-axis. In FIG. 3, the measurement signals of the I channel, Q channel, and amplitude are plotted one above the other in arbitrary units. The second transmitter 12 emitted terahertz radiation having a wavelength of 2.5 mm during CW operation. From a comparison of the graphs, it is clear that measurement signals that are caused by scattering at a defect produce a characteristic signal shape which provides information about the size and shape of the defect, in addition to the orientation and distance, in particular during the phase evaluation according to the I and Q method. Considering purely the amplitude, as shown at the bottom of FIG. 3, leads to a much simpler signal shape, which, however, is more difficult to detect, in particular in the presence of further disturbances.

LIST OF REFERENCE SIGNS

10 Transceiver, first transmitter, first receiver
12 Transceiver, second transmitter, second receiver
14 Pipe wall
16 Pipe wall
18 Pipe, object
20 Conveying direction
22 First reflector
24 Second reflector
26 Evaluation apparatus
28 Beam path
30 Beam path
32 Beam path
34 Object

The invention claimed is:

1. A method for determining dimensional data relating to an object, comprising:
    emitting terahertz radiation by a first transmitter onto at least one location on a surface of the object at a point in time;
    receiving the terahertz radiation emitted by the first transmitter by a first receiver after the terahertz radiation has passed through the object at least once;
    emitting terahertz radiation comprising a bandwidth of less than 5% of a carrier frequency of the terahertz radiation by a second transmitter onto at least one location on the surface of the object at multiple points in time;
    receiving the terahertz radiation emitted by the second transmitter by a second receiver after the terahertz radiation has passed through the object at least once;
    determining a dimension of the object from one of: (i) the terahertz radiation received by the second transmitter; (ii) a temporal change of the terahertz radiation received by the second receiver in consideration of the terahertz radiation received by the first receiver; and (iii) a spatial change of the terahertz radiation received by the second receiver in consideration of the terahertz radiation received by the first receiver,
    wherein the bandwidth of the terahertz radiation emitted by the first transmitter is more than 10% of the carrier frequency of the terahertz radiation.

2. The method according to claim 1, wherein the bandwidth of the terahertz radiation emitted by the second transmitter is less than 3% of the carrier frequency of the terahertz radiation.

3. The method according to claim 1, further comprising forming the first transmitter and the first receiver by a first transceiver and forming the second transmitter and the second receiver by a second transceiver.

4. The method according to claim 1, further comprising arranging a first reflector for reflecting the terahertz radiation emitted by the first transmitter on a side of the object that is opposite the first transmitter and arranging a second reflector for reflecting the terahertz radiation emitted by the second transmitter on a side of the object that is opposite the second transmitter.

5. The method according to claim 1, further comprising rotating the second transmitter and the second receiver about the object.

6. The method according to claim 1, further comprising transposing the second transmitter and second receiver along the object.

7. The method according to claim 1, further comprising providing multiple second transmitters and second receivers arranged around the object or along the object.

8. The method according to claim 1, further comprising emitting terahertz radiation by the second transmitter at an oblique angle of incidence onto the surface of the object.

9. The method according to claim 1, further comprising determining the dimension of the object in consideration of a refractive index of the object.

10. The method according to claim 9, further comprising determining the refractive index of the object from the terahertz radiation received by the first receiver.

11. The method according to claim 1, further comprising determining the dimension of the object from a phase change caused during passage of the terahertz radiation through the object, wherein the terahertz radiation is emitted by at least one of the first and the second transmitter.

12. The method according to claim 1, further comprising inferring a defect of the object based on rapid signal changes of the terahertz radiation signal received by the second receiver.

13. A device for determining dimensional data relating to an object, comprising:
    a first transmitter configured to emit terahertz radiation onto at least one location on a surface of the object at least one point in time;
    a first receiver configured to receive the terahertz radiation emitted by the first transmitter after the terahertz radiation has passed through the object at least once;
    a second transmitter configured to emit terahertz radiation having a bandwidth of less than 5% of a carrier frequency of the terahertz radiation onto at least one of:
    (i) the surface of the object at multiple points in time; and multiple locations on the surface of the object;
    a second receiver configured to receive the terahertz radiation emitted by the second transmitter after the terahertz radiation has passed through the object at least once; and
    an evaluation apparatus configured to determine a dimension of the object from at least one of: (i) the terahertz radiation received by the second transmitter; (ii) a temporal change of the terahertz radiation received by the second receiver in consideration of the terahertz radiation received by the first receiver; and (iii) a spatial change of the terahertz radiation received by the second receiver in consideration of the terahertz radiation received by the first receiver,
    wherein the bandwidth of the terahertz radiation emitted by the first transmitter is more than 10% of the carrier frequency of the terahertz radiation.

14. The device according to claim 13, wherein the bandwidth of the terahertz radiation emitted by the second transmitter is less than 3% of the carrier frequency of the terahertz radiation.

15. The device according to claim 13, wherein the first transmitter and the first receiver are formed by a first transceiver and the second transmitter and the second receiver are formed by a second transceiver.

16. The device according to claim 13, further comprising a first reflector for the terahertz radiation emitted by the first transmitter being arranged on a side of the object that is opposite the first transmitter and a second reflector for the terahertz radiation emitted by the second transmitter being arranged on the side of the object that is opposite the second transmitter.

17. The device according to claim 13, further comprising at least one of: (i) a rotating apparatus; (ii) and a traversing apparatus for moving the second transmitter and second receiver relative to the object during a measurement.

18. The device according to claim 13, wherein multiple second transmitters and second receivers are arranged around the object or along the object.

19. The device according to claim 13, wherein the second transmitter is arranged such that it emits the terahertz radiation at an oblique angle of incidence onto the surface of the object.

20. The device according to claim 13, wherein the evaluation apparatus is further configured to determine the dimension of the object in consideration of a refractive index of the object.

21. The device according to claim 20, wherein the evaluation apparatus is further configured to determine the refractive index of the object from the terahertz radiation received by the first receiver.

22. The device according to claim 13, wherein the evaluation apparatus is configured to determine the dimension of the object from a phase change caused during passage of terahertz radiation through the object, wherein the terahertz radiation is emitted by at least one of the first and second transmitter.

23. The device according to claim 13, wherein the evaluation apparatus is configured to infer a defect of the object based on rapid signal changes of the terahertz radiation signal received by the second receiver.

* * * * *